Jan. 23, 1934.  E. A. LUNDVALL  1,944,291
BEARING
Filed Feb. 5, 1931
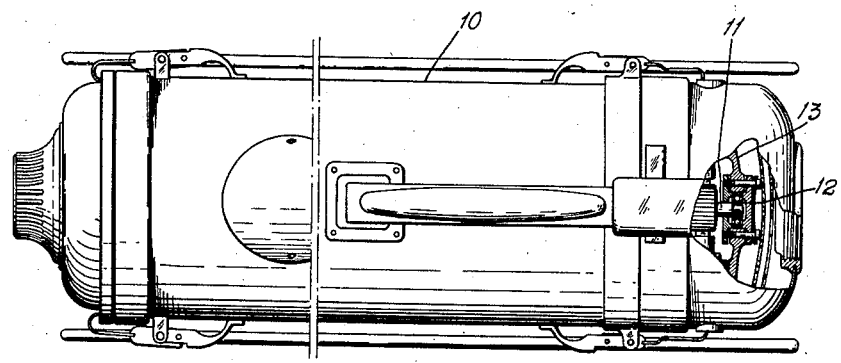
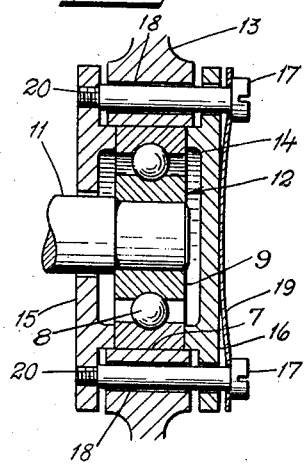
INVENTOR
Erik Albin Lundvall
BY
Wm. T. Hedlund
his ATTORNEY Patented Jan. 23, 1934

1,944,291

UNITED STATES PATENT OFFICE 1,944,291

BEARING

Erik Albin Lundvall, Stockholm, Sweden, assignor, by mesne assignments, to Electrolux Corporation, a corporation of Delaware Application February 5, 1931, Serial No. 513,675, and in Germany February 5, 1930

8 Claims. (Cl. 308—189)

This invention relates to bearings and more particularly to bearings having axial displacement within a bore adapted to receive the same and wherein one of the bearing rings or races is held fast between two disc shaped cover members or the like.

The object of the invention is to provide a construction which will facilitate assembly of such a displaceable bearing in position without the possibility of damage to the elements of the bearing by careless handling.

In accordance with the present invention the disc shaped members are held resiliently together by the insertion of resilient intermediate members.

The invention will be hereinafter more particularly described with reference to the accompanying drawing, in which:

Fig. 1 shows a vacuum cleaner fitted with a ball bearing mounting in accordance with the invention.

Fig. 2 shows in section on a larger scale the ball bearing illustrated in Fig. 1.

Referring to the drawing, 10 indicates a vacuum cleaner of known construction, the motor shaft 11 of which is rotatably carried in ball bearings. The rear ball bearing 12 includes an inner ring 9, an outer ring 14, and balls 8 between the rings and is in known manner mounted for axial displacement within an aperture 7 in the motor housing or supporting member 13. The lateral faces of outer bearing ring or race 14 of the ball bearing 12 are gripped tightly between two cover members 15 and 16 so that the ring 14 together with said cover members can, on any variation in length of the shaft 11, be displaced within the bore of the housing 13 which receives the ball bearing. Cover members 15 and 16 are held together by means of tie members such as screw bolts 17 which are also loosely mounted for displacement in bores 18 formed in the housing or support 13.

In order to avoid any distortion of the cover members 15 and 16 due to tension during the assembly of the bearing, a spring 19 is introduced between the cover 16 and the heads of the screw bolts 17. In the illustrated embodiment this spring is shown as a plate spring. Bolts 17 are, as illustrated, each constructed with a shoulder 20 which prevents the spring 19 from being completely flattened out against the cover 16 on screwing up the bolts 17.

The object of spring 19 is to prevent the peripheral flanges of the cover members 15 and 16 from being deformed due to careless assembly of the bearing. Spring 19 has a further object in regulating the pressure which is exerted by the cover 16 on the outer ball ring 14 and moreover distributes said pressure as uniformly as possible over the whole periphery of the ring. For this latter purpose it is advantageous to cause the spring 19 to lie only with its central portion against the cover 16.

I claim:

1. A shaft bearing and mounting comprising a first bearing ring, a second bearing ring, bearing members between said rings, said rings having lateral faces, a first cover member on one side of said rings, a second cover member on the other side of said rings, and means for holding the cover members against the opposite lateral faces of one of said rings comprising tie members fixed to said first cover member and loose with respect to said second cover member and a plate spring stressed between said second cover member and said tie members.

2. A shaft bearing and mounting comprising a first bearing ring, a second bearing ring, bearing members between said rings, said rings having lateral faces, a first cover member on one side of said rings, a second cover member on the other side of said rings, and means for holding the cover members against the opposite lateral faces of one of said rings comprising tie members fixed to said first cover member and loose with respect to said second cover member and resilient means stressed between said second cover member and said tie members and contacting the central portion of said second cover member to distribute force thereagainst.

3. A shaft bearing and mounting comprising a first bearing ring, a second bearing ring, bearing members between said rings, said rings having lateral faces, a first cover member on one side of said rings, a second cover member on the other side of said rings, and means for holding the cover members against the opposite lateral faces of one of said rings comprising tie members fixed to said first cover member and loose with respect to said second cover member and a plate spring stressed between said second cover member and said tie members and contacting the central portion of said second cover member to distribute force thereagainst.

4. A shaft bearing and mounting comprising a first bearing ring, a second bearing ring, bearing members between said rings, said rings having lateral faces, a first cover member on one side of said rings, a second cover member on the other side of said rings, said first cover member formed with spaced threaded recesses and said second cover member formed with correspondingly spaced openings therethrough, and means for holding the cover members against the opposite lateral faces of one of said rings comprising bolts extending loosely through the openings in said second cover member and having threaded ends for engagement with the recesses in said first cover member, shoulders formed on said bolts adjacent to the threaded ends thereof, heads on the other ends of said bolts, and resilient means stressed between said heads and said second cover member, the length of each bolt between the shoulder and the head being such that the head is spaced from said second cover member when the shoulder abuts said first cover member.

5. A shaft bearing and mounting comprising a supporting member having a main aperture extending therethrough, bearing structure mounted in said aperture and having axial movement therein comprising inner and outer bearing rings and bearing members between said rings, a first cover member on one side of said supporting member and said rings, a second cover member on the other side of said supporting member and said rings, and means for holding the cover members against the opposite lateral faces of one of said rings comprising tie members fixed to said first cover member and extending loosely through openings in said supporting member and in said second cover member, and resilient means stressed between said tie members and said second cover member, said cover members being spaced apart a distance greater than the width in axial direction of said supporting member whereby said cover members may have axial movement with respect to said supporting member.

6. A shaft bearing and mounting comprising a supporting member having a main aperture extending therethrough, bearing structure mounted in said aperture and having axial movement therein comprising inner and outer bearing rings and bearing members between said rings, a first cover member on one side of said supporting member and said rings, a second cover member on the other side of said supporting member and said rings, and means for holding the cover members against the opposite lateral faces of one of said rings comprising tie members fixed to said first cover member and extending loosely through openings in said supporting member and in said second cover member, and resilient means stressed between said tie members and said second cover member and contacting the central portion of said second cover member, said cover members being spaced apart a distance greater than the width in axial direction of said supporting member whereby said cover members may have axial movement with respect to said supporting member.

7. A shaft bearing and mounting comprising a supporting member having a main aperture extending therethrough, bearing structure mounted in said aperture and having axial movement therein comprising inner and outer bearing rings and bearing members between said rings, a first cover member on one side of said supporting member and said rings, a second cover member on the other side of said supporting member and said rings, and means for holding the cover members against the opposite lateral faces of one of said rings comprising tie members fixed to said first cover member and extending loosely through openings in said supporting member and in said second cover member, and a plate spring stressed between said tie members and said second cover member and contacting the central portion of said second cover member, said cover members being spaced apart a distance greater than the width in axial direction of said supporting member whereby said cover members may have axial movement with respect to said supporting members.

8. A shaft bearing and mounting comprising a supporting member having a main aperture extending therethrough, bearing structure mounted in said aperture and having axial movement therein comprising inner and outer bearing rings and rolling members between said rings, and a member forming a housing for said bearing structure comprising cover members axially to each side of the bearing structure, said cover members being constructed to bear against the lateral faces of the outer bearing ring and having flanges extending to each side of said supporting member, said flanges being spaced apart a distance greater than the width in axial direction of said supporting member with the cover members contacting the outer bearing ring, and means for urging said cover members toward each other comprising axially extending tie members secured in one of said cover members and passing loosely through openings in said supporting member and loosely through the other cover member and a resilient member stressed between a plurality of tie members and the cover member through which the tie members pass, whereby the bearing structure, cover members, tie members and the resilient member are movable axially with the shaft in said main aperture.

ERIK ALBIN LUNDVALL.